United States Patent
Nave

(10) Patent No.: US 9,550,129 B2
(45) Date of Patent: Jan. 24, 2017

(54) MULTIPLAYER GAME PLATFORM FOR TOYS FLEET CONTROLLED BY MOBILE ELECTRONIC DEVICE

(71) Applicant: Tamir Nave, Hod HaSharon (IL)

(72) Inventor: Tamir Nave, Hod HaSharon (IL)

(*) Notice: Subject to any disclaimer, the term of this patent is extended or adjusted under 35 U.S.C. 154(b) by 0 days.

(21) Appl. No.: 15/027,253

(22) PCT Filed: Oct. 14, 2014

(86) PCT No.: PCT/IB2014/065289
§ 371 (c)(1),
(2) Date: Apr. 5, 2016

(87) PCT Pub. No.: WO2015/059604
PCT Pub. Date: Apr. 30, 2015

(65) Prior Publication Data
US 2016/0243455 A1    Aug. 25, 2016

(30) Foreign Application Priority Data

Oct. 24, 2013 (IL) .......................... 229082

(51) Int. Cl.
*A63F 3/04* (2006.01)
*A63H 30/04* (2006.01)
(Continued)

(52) U.S. Cl.
CPC ............ *A63H 30/04* (2013.01); *A63F 13/211* (2014.09); *A63F 13/213* (2014.09);
(Continued)

(58) Field of Classification Search
CPC .............................. A63F 13/00; A63F 13/2145
See application file for complete search history.

(56) References Cited

U.S. PATENT DOCUMENTS 6,752,720 B1    6/2004  Clapper et al.
8,315,673 B2    11/2012 Gum
(Continued)

FOREIGN PATENT DOCUMENTS

WO    2012036593    6/2012

OTHER PUBLICATIONS

International Search Report in PCT/IB2014/065289 dated Mar. 4, 2015.
(Continued)

*Primary Examiner* — Jay Liddle
*Assistant Examiner* — Alex F. R. P. Rada, II
(74) *Attorney, Agent, or Firm* — Manelli Selter PLLC; Edward J. Stemberger

(57) ABSTRACT

A multi-player game platform comprising: at least one mobile electronic device (MED) comprising a processor and configured to execute programmable commands of a control software application; said at least one MED additionally comprising a display configured to provide GUI (Graphical User Interface) means for receiving user input and providing output to a user, a digital camera and communication components configured to communicate with at least one toy, said at least one MED is one of a master MED, wherein said control software application is a master application and a slave MED, wherein said control software application is a slave application; and at least one electro-mechanical toy wirelessly controlled by the control software application, said toy comprising a CPU, a digital memory, a chassis and at least one sensor, said digital memory configured to store a toy software application configured to manage the toy according to commands from the control software application, wherein said digital camera is configured to capture images of said toys and wherein said display is configured to display said captured images, said GUI comprising means (Continued)

for selecting and controlling toys from said displayed image, said processor comprising image processing means configured to process said captured images.

5 Claims, 18 Drawing Sheets

(51) Int. Cl.

| | | |
|---|---|---|
| *A63F 13/211* | (2014.01) | |
| *A63F 13/65* | (2014.01) | |
| *A63F 13/213* | (2014.01) | |
| *A63F 13/2145* | (2014.01) | |
| *A63F 13/34* | (2014.01) | |
| *A63F 13/92* | (2014.01) | |
| *A63F 13/215* | (2014.01) | |
| *A63F 13/323* | (2014.01) | |
| *A63F 13/235* | (2014.01) | |
| *A63F 13/31* | (2014.01) | |
| *A63H 17/00* | (2006.01) | |
| *G06F 3/048* | (2013.01) | |
| *A63F 13/218* | (2014.01) | |

(52) U.S. Cl.
CPC ........ *A63F 13/215* (2014.09); *A63F 13/2145* (2014.09); *A63F 13/235* (2014.09); *A63F 13/31* (2014.09); *A63F 13/323* (2014.09); *A63F 13/34* (2014.09); *A63F 13/65* (2014.09); *A63F 13/92* (2014.09); *A63H 17/00* (2013.01); *G06F 3/048* (2013.01); *A63F 13/218* (2014.09)

(56) References Cited

U.S. PATENT DOCUMENTS

| | | | |
|---|---|---|---|
| 8,882,559 B2* | 11/2014 | Fessenmaier | A63H 30/04 446/321 |
| 2006/0024866 A1 | 2/2006 | Gan et al. | |
| 2006/0223637 A1 | 10/2006 | Rosenberg | |
| 2008/0101693 A1 | 5/2008 | Young et al. | |
| 2009/0005167 A1 | 1/2009 | Arrasvuori et al. | |
| 2010/0177931 A1 | 7/2010 | Whyock et al. | |
| 2012/0009845 A1* | 1/2012 | Schmelzer | A63H 17/00 446/431 |
| 2012/0079426 A1 | 3/2012 | Jin et al. | |
| 2013/0109272 A1 | 5/2013 | Rindlisbacher | |

OTHER PUBLICATIONS

International Preliminary Report on Patentability in PCT/IB2014/065289 dated Feb. 22, 2016.

* cited by examiner

| TOY'S FUNCTIONS 125 |
|---|
| 1. RECEIVE FROM A SENSOR 125.1
2. RECEIVE DATA FROM SHORT RANGE COMMUNICATION RECEIVER 125.2
3. SEND DATA TO SHORT RANGE COMMUNICATION TRANSCIEVER 125.3
4. RECEIVE DATA FROM LONG RANGE COMMUNICATION RECEIVER 125.4
5. SEND DATA TO LONG RANGE COMMUNICATION TRANSCIEVER 125.5
6. CONTROL SERVOS/MOBILITY MECHANISM/LEDS/SOLENOID/ ELECTRO-MAGNET/AUDIO 125.6
7. STORE AND RETRIEVE DATA IN/ FROM MEMORY 125.7 |

| MASTER'S FUNCTIONS 130 |
|---|
| 1. INITIATE GAME 130.1
2. SEARCH FOR TOYS IN ARENA 130.2
3. ALLOCATE ID TO TOYS 130.3
4. SELECT GAME TYPE 130.4
5. START GAME 130.5
6. PAUSE GAME 130.6
7. END GAME 130.7
8. SAVE/LOAD GAME 130.8
ALL SLAVE FUNCTIONS |

| SLAVE'S FUNCTIONS 140 |
|---|
| 1. RECEIVE SIGNALS FROM COMMUNICATION RECEIVER 140.1
2. SEND SIGNALS TO COMMUNICATION TRANSCIEVER 140.2
3. RUN ANY CODE OF VIRTUAL APPLICATION 140.3
4. RECEIVE /WRITE FROM/TO AUXILIARY DEVICES 140.4
5. IDENTIFY TOY 140.5
6. TRACK TOY 140.6
7. CALCULATE NAVIGATION COMMANDS 140.7 |

Fig. 6

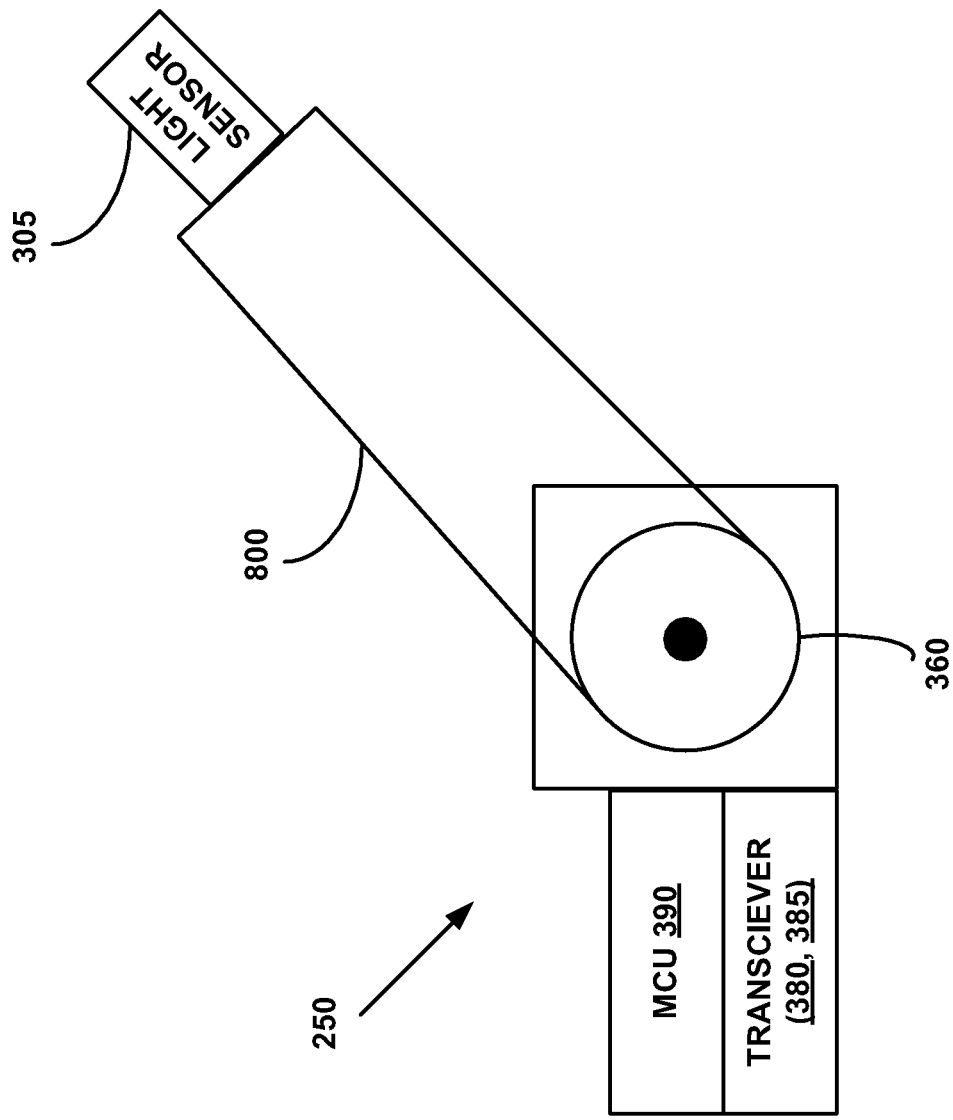

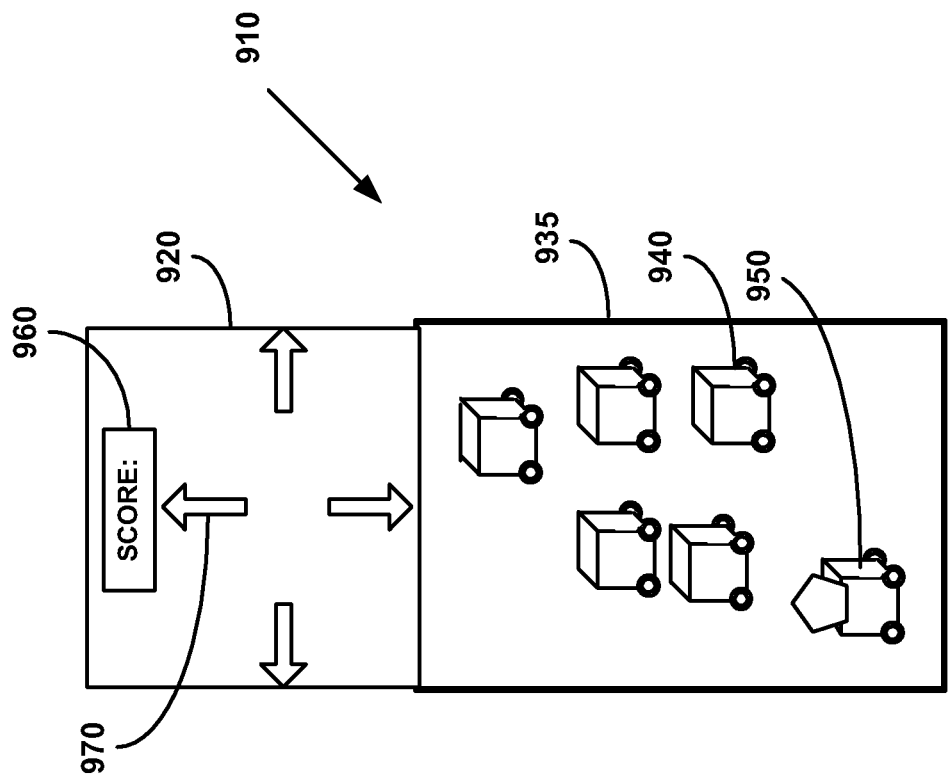
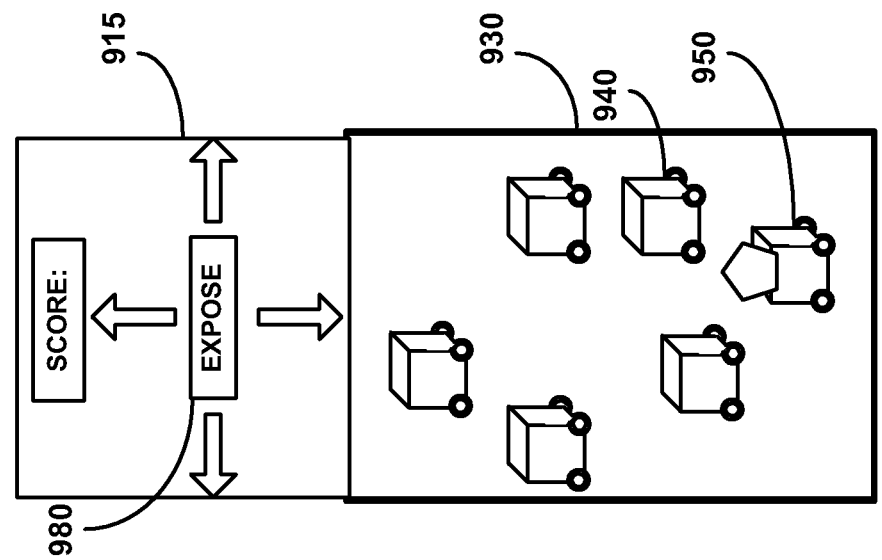
Fig. 9A
Fig. 9B

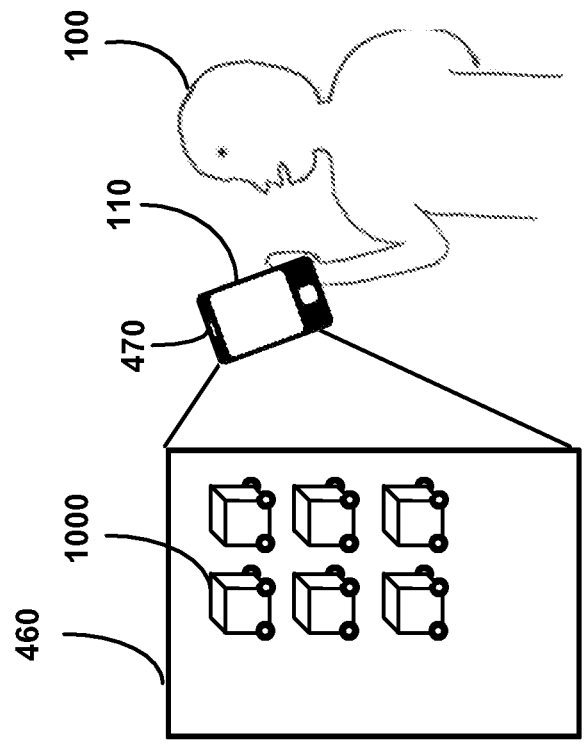
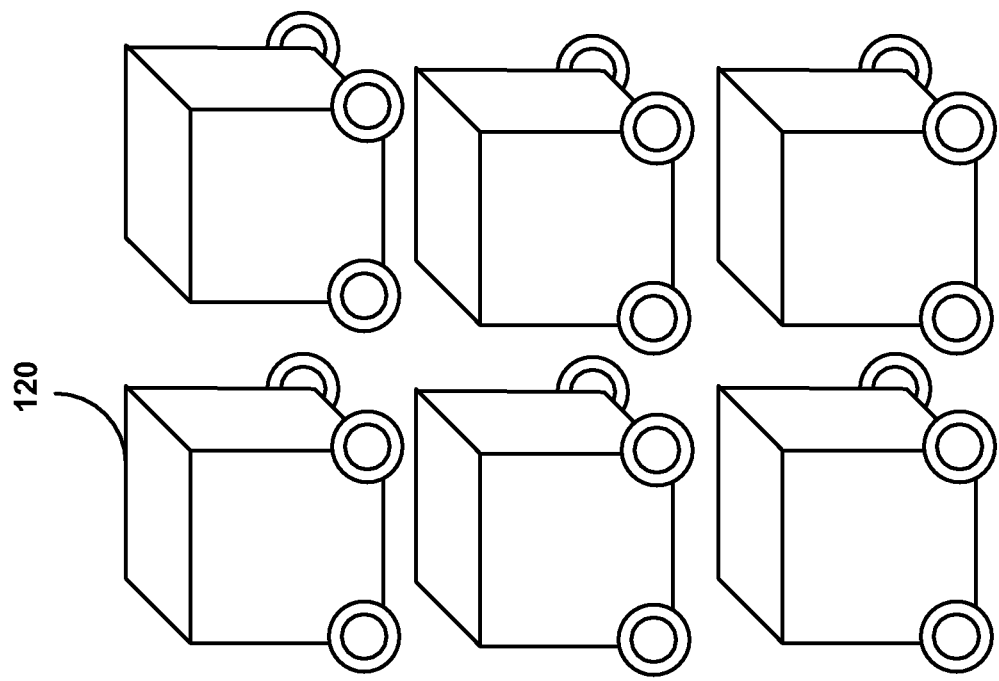
Fig. 10

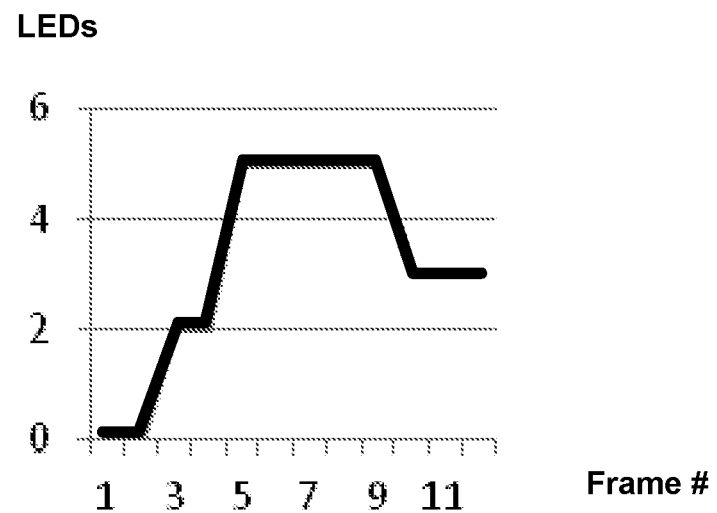
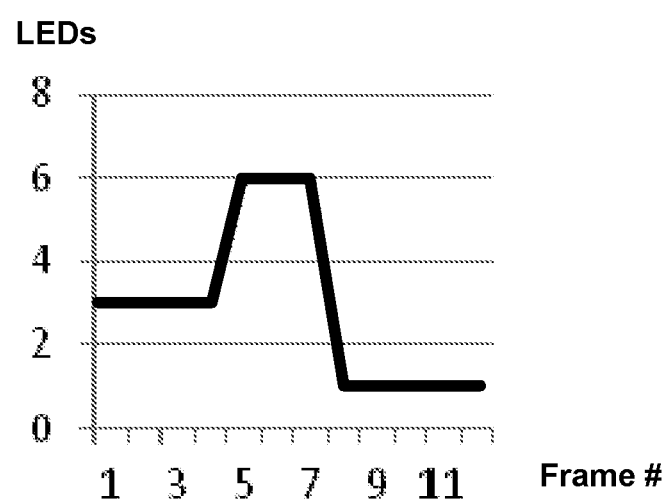
Fig. 14

MULTIPLAYER GAME PLATFORM FOR TOYS FLEET CONTROLLED BY MOBILE ELECTRONIC DEVICE

TECHNOLOGY FIELD

The present invention belongs to both the field of toys and the field of computer gaming.

BACKGROUND

There are many software games on computers or smart-phones that are completely virtual (like Warcraft, C&C, Dune, Farmville). There are many toys that are remote controlled by smart-phones or other controllers (like remote controlled cars, tanks, helicopters etc). The remotely controlled toys enable the players to exploit their skills of nimbleness and let them enjoy a perceptible experience of control. On the other hand, many virtual games enable the players to exploit their skills of strategy, imagination, creativity and let them enjoy an intellectual experience of control. In view of the foregoing, it would be desirable to provide a game that enables the players to enjoy a perceptible experience of a game along with the advantages of virtual games. The present invention is in the combined fields of toys controlled by MCD and software games.

US Published Patent Application No. 2009005167 (A1) discloses methods, systems and apparatuses for gaming using one or more mobile communication devices and one or more remotely-controllable drones, the one or more mobile communication devices being adapted to remotely-control the one or more remotely-controllable drones including providing game control software to one or more of the mobile communication devices, the game control software including rules for play affecting the operation of the remotely-controllable drones and operating a remotely-controllable drone using the mobile communication device with remote control within the rules of play of the game.

US Published Patent Application No. 2013109272 (A1) discloses a method for controlling a remote toy by means of a motion sensing device and/or a touch screen on a mobile device. The mobile device can be a standard mobile phone, tablet, or any other device equipped with either a motion sensing device, touch screen, or both for controlling specific movements on a remote toy.

U.S. Pat. No. 7,568,963 (B1) discloses a plurality of individual toys, at least a first one of which generates acoustic signals and at least a second one of which receives acoustic signals. When the second toy receives acoustic signals from the first toy, it responds, for example, by generating a sound and/or controlling its motion. In a preferred embodiment of the invention, the toys flock and/or form a procession of toys which follow a leader toy, for example a mother goose and a plurality of following and preferably quacking goslings.

US Published Patent Application No. 2012238366 (A1) discloses an amusement system comprising a game field and a plurality of robots that are manipulated by a plurality of user interface controllers at a remote location relative to the game field. A network links each of the user interface controllers to one of the robots to cause the robot to perform at least one action. A video camera focuses on the game field to provide a streaming image of the game field through the network. A video display device at the remote location receives the streaming video image from the network and displays the streaming video image of the robots. A method of providing a game that involves controlling a plurality of electronically controlled mechanical robots over a communication network that provides streaming video from a streaming video system to the user interface controllers at a remote location.

PCT Published Patent Application No. WO9853567 (A1) discloses a controllable toy system operative in conjunction with a household audio entertainment player, the system including a controllable toy and an audio entertainment analyzer operative to analyze an audio entertainment signal so as to recognize therewithin predetermined audio entertainment elements and to command the controllable toy (120) to perform at least one action according to the predetermined audio entertainment elements at a time corresponding to a time at which the audio entertainment elements are played by the household audio entertainment player.

SUMMARY

According to an aspect of the present invention there is provided a multi-player game platform comprising: at least one mobile communication device (MED) comprising a processor and configured to execute programmable commands of a control software application; said MED additionally comprising a display configured to provide GUI (Graphical User Interface) means for receiving user input and providing output to a user, a digital camera and communication components configured to communicate with at least one toy, said MED is one of a master MED, wherein said control software application is a master application and a slave MED, wherein said control software application is a slave application; and at least one electro-mechanical toy wirelessly controlled by the control software application, said toy comprising a CPU, a digital memory, a chassis and at least one sensor, said digital memory configured to store a toy software application configured to manage the toy according to commands from the control software application.

The at least one MED may be selected from the group consisting of: smart-phone, iphone, android based cellular, tablet, ipad, ipod, google glass or any other programmable device with transceiver.

The at least one MED may comprise a plurality of MEDs wirelessly controlling a plurality of toys, said toys further communicating with each other.

The digital camera may be configured to capture images of said toys and said display may be configured to display said captured images, said GUI comprising means for selecting and controlling toys from said displayed image.

The control software application may deliver a command to more than one toy.

The command may be interpreted differently for each toy.

The toys' sensors may be selected from the group consisting of: line sensor, light sensor or camera, force sensor, distance sensor, magnetic sensor, RFID sensor and digital compass.

The toys may further comprise at least one of a mobility mechanism, a servo, a solenoid, static or electro-magnets and at least one LED.

The at least one MED may further comprise at least one of a microphone, a speaker, an accelerometer and a gyro.

The master application may be configured to manage the game by communicating with each of the slave applications.

The slave application may be configured to control a toy software of another player's toy.

The toy software may be configured to perform at least one of: receiving sensor's signals, receiving and sending data from/to other nearby toys, receiving and sending data from\to the MED, commanding the toy's servos, operating the toy's mobility mechanism, turning on and off a LED in a predefined timing or in constant frequency, operating a solenoid or electro-magnet and receiving and sending data to/from the toy's memory.

The slave application may be configured to perform at least one of: receiving and sending data from/to the communication components of the MED, running a virtual part of the game comprising at least the GUI and controlling at least one auxiliary device of the MED in accordance with specific game requirements.

The at least one auxiliary device may be selected from the group consisting of: a microphone, a speaker, an accelerometer, a gyro, a touch screen and a camera.

The master application may be configured to perform at least one of: initiating a game's hardware and software, searching toys by sending a general message and waiting for return messages from the toys, allocating an identity to each toy, sending identity and start messages to slave applications, selecting game type, starting, ending, loading, saving or pausing a game and controlling at least one toy.

The game type may be selected from the group consisting of: pre-programmed, turns and simultaneous.

The digital memory may be further configured to store at least one game program to be initiated by a command from the MED.

Each game may comprise a virtual part and a physical part, said virtual part running on the MED and comprising at least one of music, graphics, GUI, score, money and resources management.

According to another aspect of the present invention there is provided a method of conducting multi-player games comprising physical and virtual components, comprising the steps of: selecting a game; downloading a control program for playing said selected game to at least one MED; capturing an image of participating toys; displaying the captured image; selecting at least one toy from said display; identifying said at least one selected toy; and communicating with said selected at least one toy for manipulating it according to said control program.

Selecting at least one toy from said display may comprise touching said displayed toy, calculating the center of the touched area on the display and defining a window of predefined size and shape around the calculated center.

Identifying captured toys may comprise using one of: image recognition algorithm, histogram of number of blinking LEDs per time unit and brightness histogram.

Manipulating said selected at least one toy may comprise navigating said at least one toy from a current location to a selected location.

Navigating said at least one toy may comprise tracking the toy, calculating the toy's current motion parameters and controlling the motion parameters towards the selected location.

The toy's motion parameters may comprise velocity and direction.

The method may further comprise displaying a dynamic representation of the game on the MED display.

The method may further comprise downloading a control program for playing said selected game to at least one toy.

The method may further comprise communicating between toys.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 6 depict the list of main functions of the software of the invention;

FIG. 8 demonstrates the canon toy (250);

FIG. 9 depict the application screens of a possible game for example: "Seek and Hide";

FIG. 10 depict the navigation feature of the user interface;

FIG. 14 shows two exemplary toy histograms showing number of lit LEDs for each frame;

DETAILED DESCRIPTION OF EMBODIMENTS

The present invention provides a multi-player game platform that consists of software applications on mobile electronic devices (MED) and a set of external electro-mechanical devices (toys) wirelessly controlled by the MED application. Each player controls a different fleet of toys consisting of at least one toy.

The MED may be any mobile electronic device such as a smart-phone, iphone, android based cellular, tablet, ipad, ipod, google glass or any other programmable device with transceiver.

The invention is about implementing a game (or particularly a strategic game) of players managing an event (or particularly tactic war) between their fleets of toys (or particularly their armies) using the software on their MEDs. The toys comprise sensors that improve the game experience. The invention defines methods to implement some elements in the game:

Short range communication between toys—which is communication between two toys that works only when the toys are close enough to each other (10-30 cm)

Flags stealing using magnets

Tactical gaming using the digital memory of the toys and using different types of toys control.

Moreover, the invention consists of a new user interface that enables the player to control multiple units in the physical world by seeing their images on his MED screen and pressing the touch screen on his MED.

The user interface has two features:

1. Select toys from image—The player turns the MED's camera in a way such that he sees the toys he wants to select. The player selects the toys by clicking their images on the MED's screen. The MED identifies the player selection and then may apply several functions on the selected toys.

Examples for possible functions on the selected toys may be: tank shoots, Barbie smiles, light turn on, navigate toy, etc.

2. Navigate units from image—After selecting toys, one of the available functions is navigating the toys to a certain location in the room. The player presses any location on the image. This location represents a line of sight to a location in the physical world. The toys maneuver to this location in the physical world or only turn to the direction of this location. This feature is obviously relevant only for mobile toys.

Figure 1:
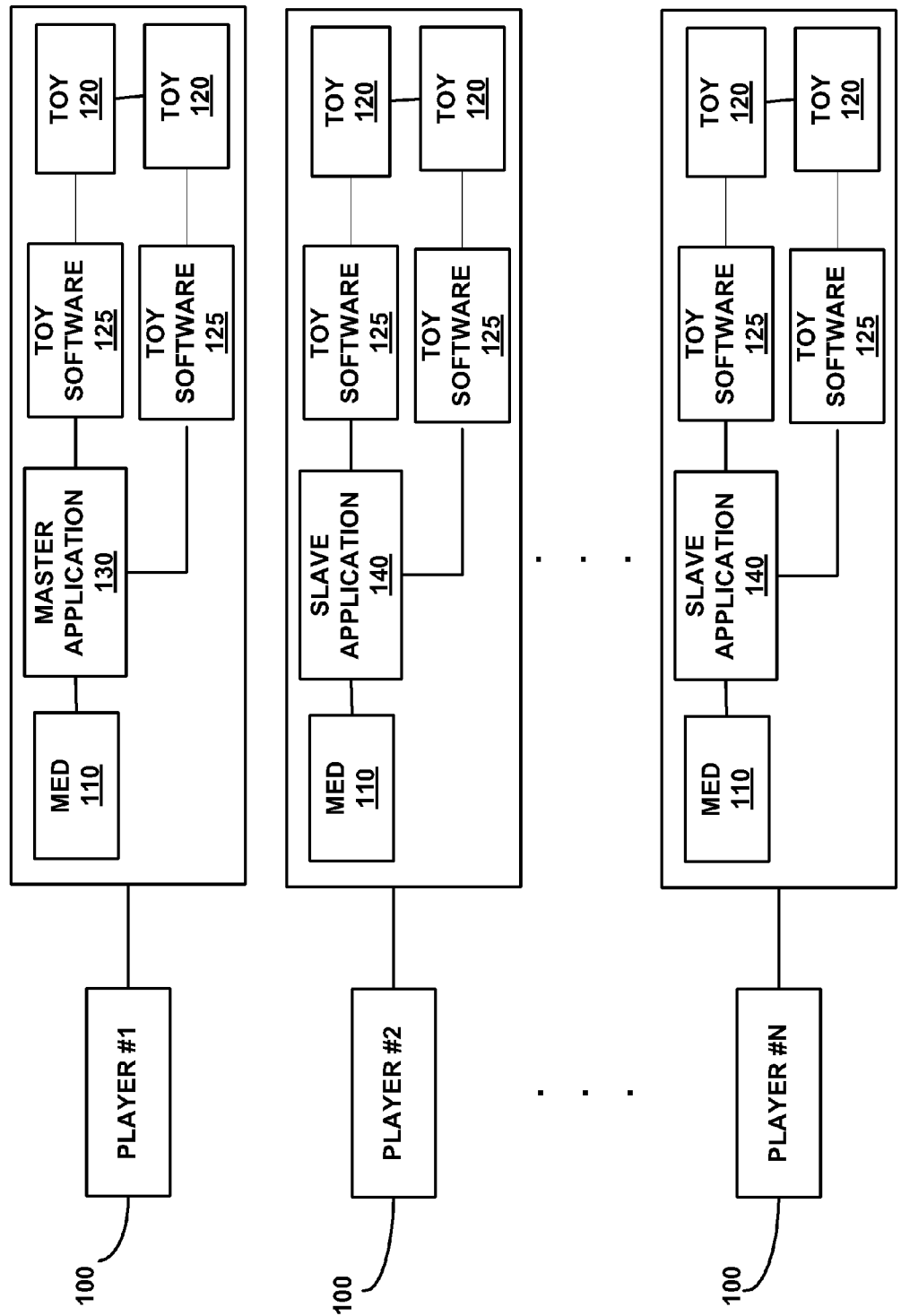
FIG. 1 describes the game structure.

Referring to FIG. 1, the present invention provides a multi-players 100 game to be played using several MEDs 110 and at least one toy 120 for each player, controlled by the respective MED. Each MED 110 runs a software application. One of the players' MED is called "Master" and runs a master software application 130 that manages and initiates the game. The other players' MEDs are "Slaves" and run a slave software application 140 that has partial functionality of the Master application 130. Each of the software applications Master 130 and Slaves 140 communicates with toys 120 which are electro-mechanical devices of various types using long range communication. The toys 120 communicate between themselves using short range communication. Each toy has its unique operating software 125.

In a different embodiment of the software architecture, the master application may run on a server and not on a MED of one of the players. This option enables a more complicated master application and hence a more sophisticated virtual game. Moreover, it enables the game to proceed if the player that holds the MED with the master application leaves the game. However, throughout the following description we assume that the master application is running on the MED of one of the players.

Each toy and each MED is allocated a unique ID by the master when the game is initiated.

The software (130, 140) may control each toy at a time or it may control several toys simultaneously. It may deliver the same command to more than one toy, like move forward, or it can deliver a more sophisticated command to more than one toy that will be interpreted differently for each toy, like for example the sophisticated command is to encircle a structure or a specific toy with ID=X and shoot at it. This command will be interpreted as a sequence of commands for each toy to move to a different location and start shooting in its turn by a certain order and timing.

Figure 2:
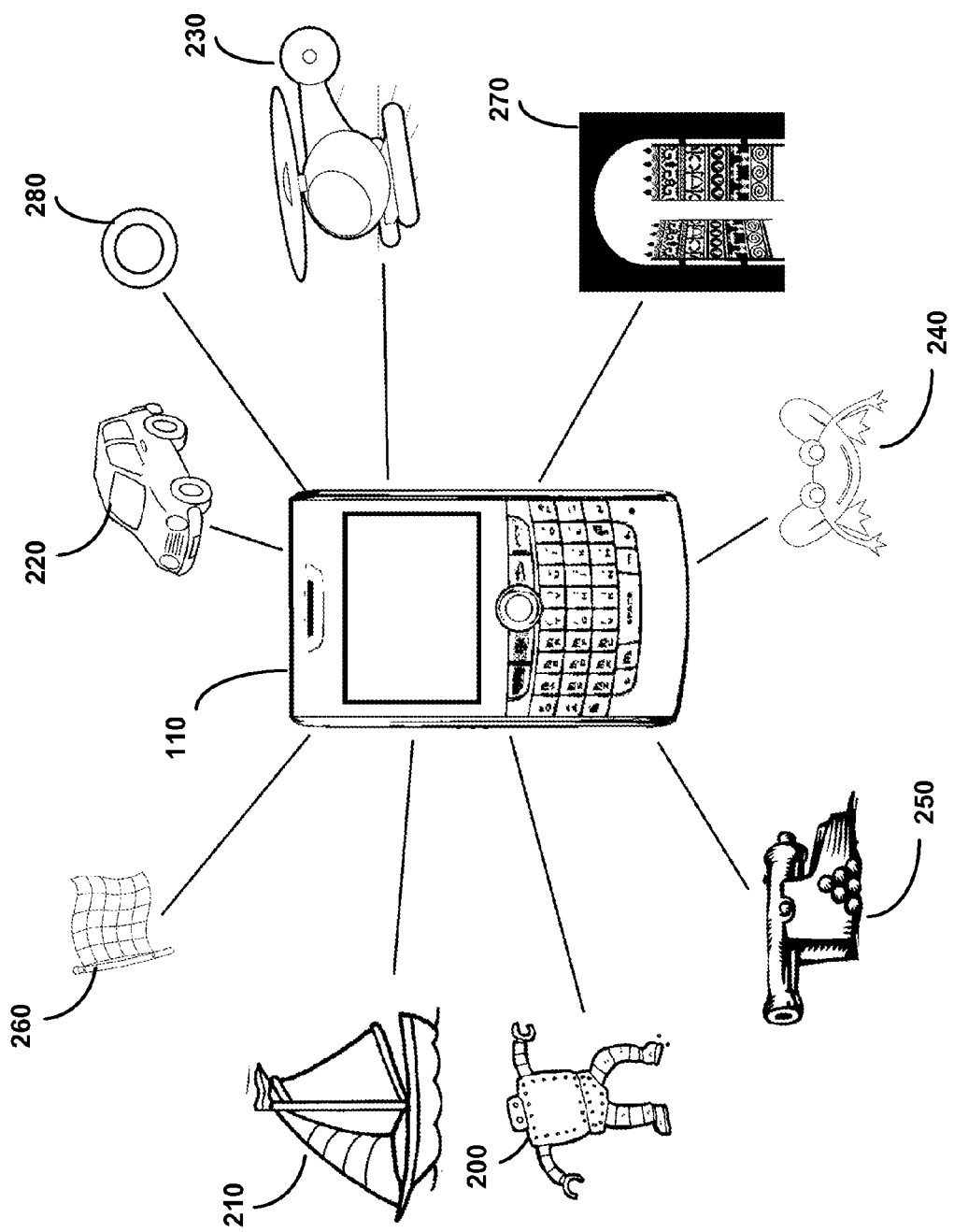
FIG. 2 illustrates a smart-phone controlling a set of various toys.

FIG. 2 shows a single MED 110 controlling several exemplary types of toys 120:

200—A walking toy like a robot or other mechanical mechanism having 2 or more legs;

210—A floating toy like a boat;

220—A driving toy like a car, a motorcycle, a truck or any other mobile toy with wheels;

230—A flying toy like a helicopter, a plane, a mosquito, a butterfly;

240—A jumping toy like a frog or any other bouncing mechanism (for example based on springs or electro-magnets);

250—A shooting toy a like controlled steering cannon (the shooting method will be explained below);

260—A static toy containing sensors and communication devices (for example, a flag with RFID that transmits a message when a different RFID chip is close to it and a magnet enabling the toy to attach to the other close by toy);

270—A dynamic structure like a gate that can be opened or closed;

280—A static toy with RFID, such as a mine that can be programmed to harm or kill an approaching toy or a reward (e.g. added resources) presented to an approaching toy.

Figure 3:
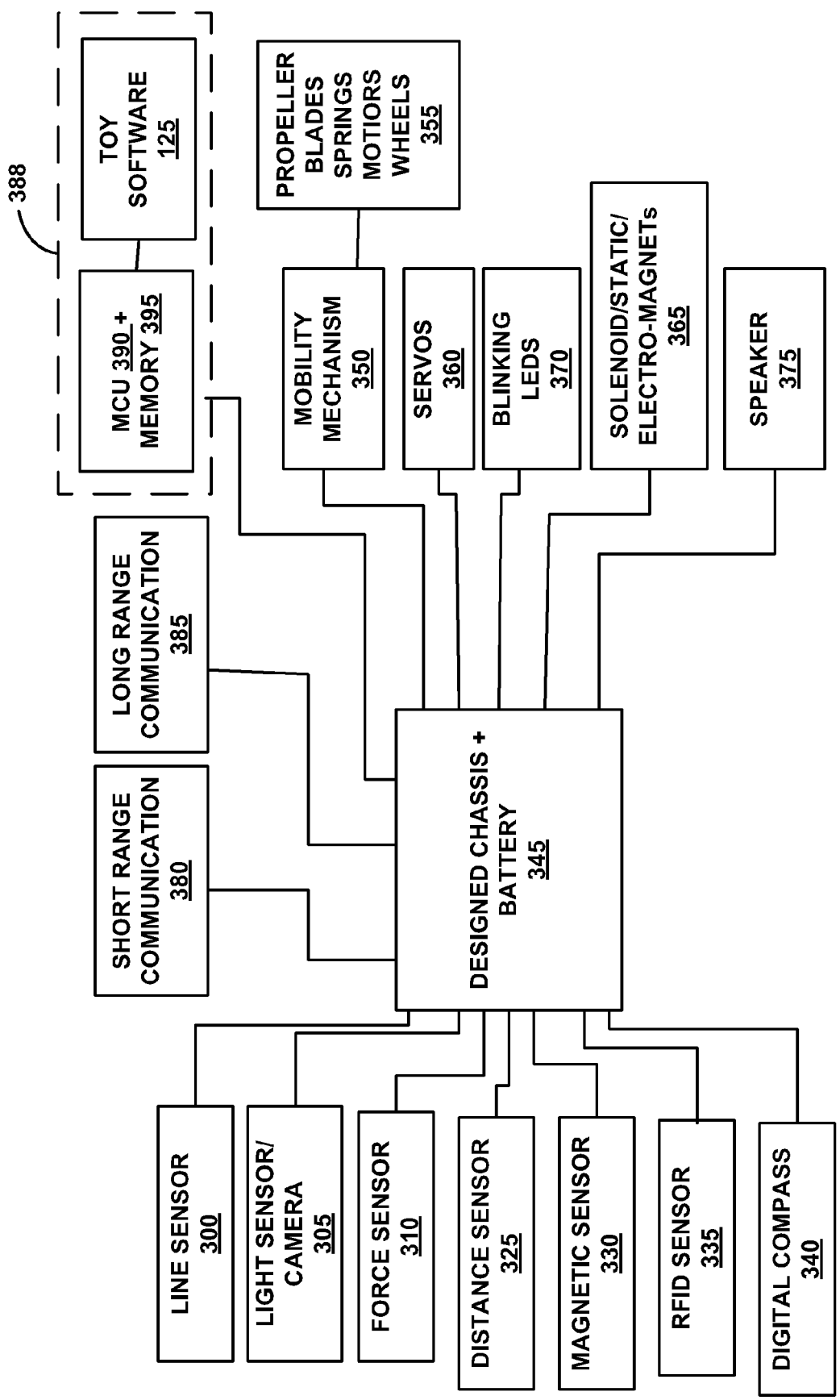
FIG. 3 is a functional block diagram of a toy and the components he may consist.

Although the toys, as exemplified in FIG. 2, may vary, FIG. 3 depicts the relevant components of each toy 120. Not every toy includes all of the sensors 300-340; it depends on the functionality of each toy. Each toy has a chassis and a battery 345; for example a car, a helicopter, a gate. The toys may also include a mobility mechanism 350 (for mobile toys) like wheels, rotors, springs, blades, motors 355. The toys may include servos 360 for self movements like opening/closing of a gate, or a steering cannon or a wingtip, or lifting an ax for a walking toy (such as available, for example, from http://www.dfrobot.com/). The toy may also include solenoid 365, static or electro-magnets and LEDs 370. The LEDs of the toy may blink in a certain frequency, in order to be recognizable by the image processing algorithm. The magnets 365 can be used to attach a different static metal toy or a toy having a magnet in order to transfer it to another location.

The toy may further be equipped with several types of sensor; for example: a line sensor 300 that detects a colored line beneath its body (such as QRE1113 line sensor, available from https://www.sparkfun.com/), a camera or light sensor 305 (chips can be photodiode, photo resistor, light to frequency TSL235R or a CMOS camera module such as available from https://www.sparkfun.com/) that detects photons (in any visible and invisible frequencies) radiated toward it, a force sensor (such as a force sensitive resistor 0.5 available from https://www.sparkfun.com/), that senses the amount of physical force operating on it, a distance sensor 325 (such as Ultrasonic range finder LV-EZ0 available from http://www.maxbotix.com/) that estimates the distance to the nearest object in front of the sensor, a magnetic sensor 330, such as MAGNETOMETER DIGITAL TRIPLE AXIS—HMC5883L, available from https://www.sparkfun.com/products/10494, that senses the magnitude of a magnetic field in the environment of the sensor, a RFID sensor 335 (such as RFID reader ID-20 available from https://www.sparkfun.com) that detects other RFID chips in its environment and a digital compass 340 (such as a compass module HMC6352 available from https://www.sparkfun.com/) that indicates the north direction.

Each toy also contains communication components for short range 380 and for long range 385. The long range is aimed to communicate with the MED and the short range is aimed to communicate with other toys only when they are close to each other. The short range communication can be implemented by IR or RF.

The toy transmits to whoever listens (broadcast mode) an IR or RF signal as weak as possible, but still strong enough for being detected in the range of 10-30 cm. Usually transmission spreads in the open air not only for short environment, hence the following method are used:

For IR (in which the beam radiates directionally), transmit diagonally toward the floor (this way the signal can be received only in the near neighborhood of the transmitter).

For RF (in which the beams spread omni-directionally), in the receiver side, check if the RSSI (signal strength register) is higher than a certain threshold. This way the toy that receives the signal knows whether to ignore or do something with the received data according to its distance from the transmitting toy.

The long range communication 385 can be implemented by Bluetooth or WiFi module that usually exist in any MED, or by IR or RF transceiver that needs an additional device to attach to the MED. Exemplary long range communication modules are Bluetooth modem Bluesmirf silver or XBee pro 60 mw available from https://www.sparkfun.com; or BLE2540 available from http://www.fasttech.com/).

Moreover, the sensors, the communication, and all the other mechanisms described above are controlled by a board 388 that contains a main controller unit (MCU) 390, digital memory 395 and other relevant electronic components like buses, A2D, D2A, etc. (for example an Arduino board model pro-mini 328 available from http://www.arduino.cc/ or Beagleboard, available from http://beagleboard.org/hardware). The board 388 stores the toy's software 125 that manages the toy according to commands from the software application.

Each toy may additionally comprise a speaker 375 for playing during the game.

Figure 4:
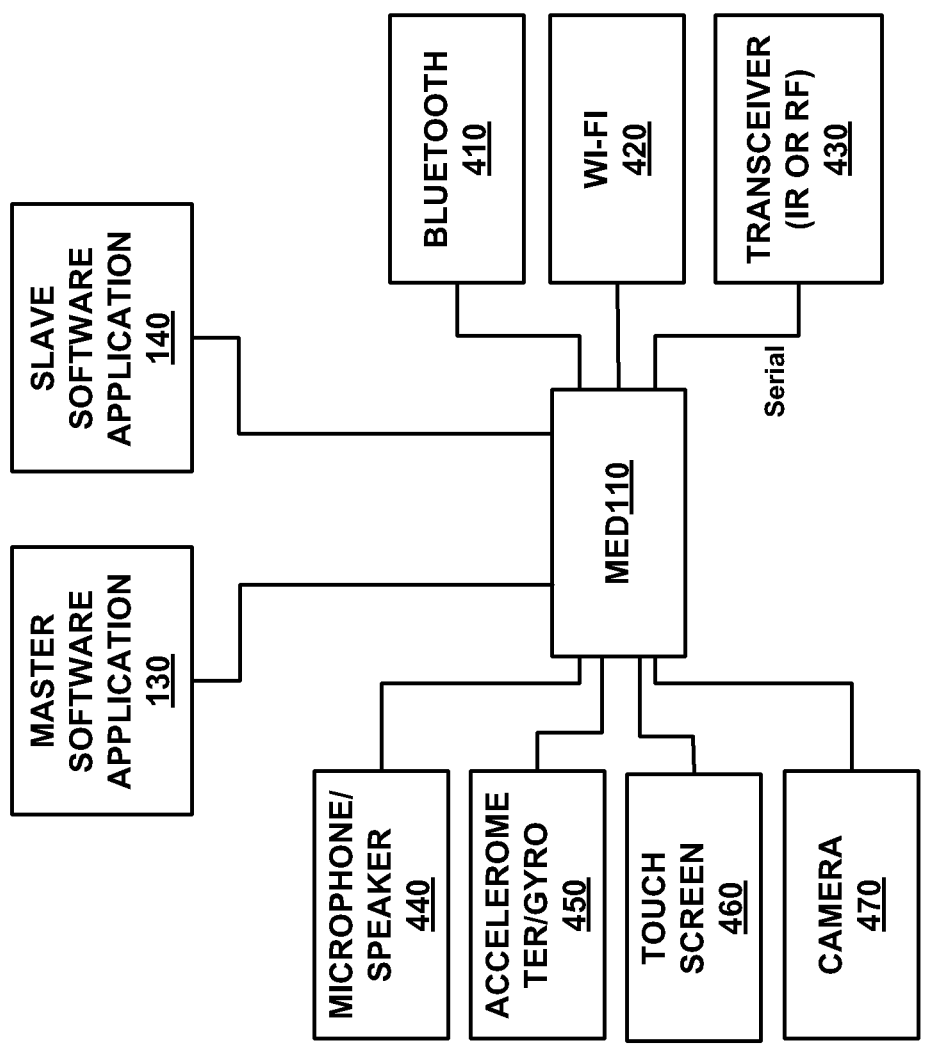
FIG. 4 is a functional block diagram of a MED and its relevant components.

FIG. 4 depicts the relevant components of each MED 110, comprising: relevant communication chips (Bluetooth 410, Wi-Fi 420, IR or RF transceiver/transmitter or receiver 430 that enables control and data transfer to and from the toys. Some components (like IR\RF communication chips) may not originally connect to the MED, hence the chips may be physically separated and connected using a serial wiring usually through the audio jack of the MED. The MED contains the software application of the master 130 and the slave 140 that contains the virtual part of the game and the user interface that enables the players 100 to control their fleet of toys 120. Moreover the MED may contain auxiliary devices such as a microphone and/or speaker 440 that enable receiving voice commands from the players and playing background sounds or music during the game, respectively, an accelerometer and a gyro 450 that enable the player 100 to rotate the MED 110 and use it as a joystick that controls the toys, a touch screen 460 that enables user friendly buttons for the players and a camera 470 that enables to acquire the image of the game arena and use the image for mapping the physical game and combining it with the virtual game. The camera may be internal to the MED or external and connected serially or wirelessly to the MED. One method of this combination is the innovative user interface that will be elaborated below.

Figure 5:
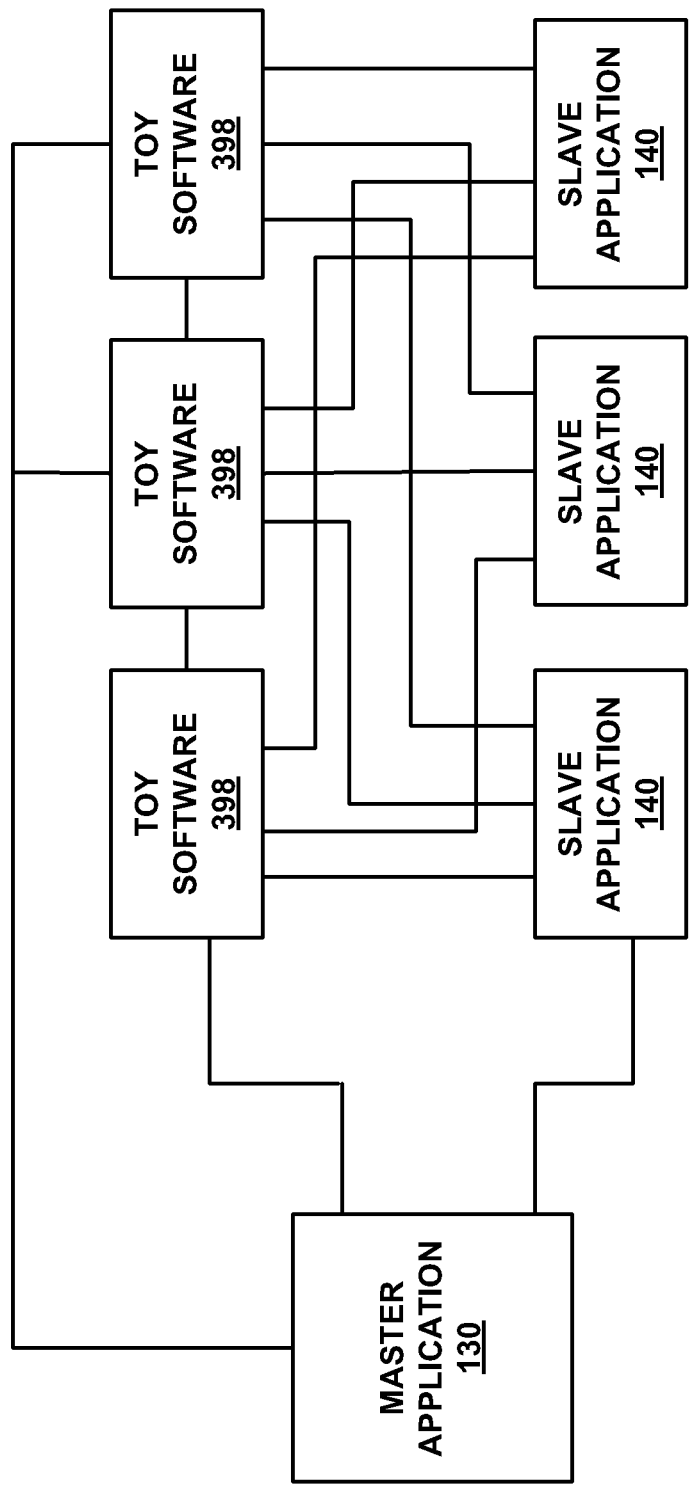
FIG. 5 depict the software modules and their connectivity.

FIG. 5 depicts the connections between the toy software 125 and software in the game implementation. The master software application 130 communicates with each of the slave software applications 140. The master application 130 manages the game and also contains all the functions of the slave application which enables its player 100 to play his fleet of toys. The master application 130 can run on an external server and not necessary on a MED of one of the players. Each of the master and slave applications (130, 140) communicates with all the toys software 125. The slave application 140 of one player 100 can control a toy software 125 of another player's toy in order to enable toy "stealing" as a possible element in the game. The software (130, 140) implements the virtual part of the game.

An example for this is depicted in FIGS. 9A and 9B, showing exemplary GUI of a hide and seek game, where FIG. 9A shows a seeker's GUI 900 and FIG. 9B shows a hider's GUI 910. Each GUI is divided into a real time image of the arena, as captured by the MED camera (930, 935) and a control area (915, 920). Both control areas comprise a score board 960 and direction arrows 970 for controlling the respective toy's movement. The seeker's control area 915 may include an additional "Expose" control for asserting discovery of the hider. Note that the real time images of the arena in FIGS. 9A and 9B are different, assuming different points of view of the same game field.

FIG. 6 depicts the main functions of the various software modules.

The main functions of each toy software 125 consist of:
receiving sensor's 300-340 signals (125.1);
receiving and sending data from/to other nearby toys using the short range communication 380 (125.2);
receiving and sending data from\to the MED using the long range communication 385 (125.4, 125.5);
commanding the toy's functions such as servos 360 to rotate or move in a certain velocity or angle (125.6;
operating the mobility mechanism 350 to move (forward, backward, left, up or down) (125.5);
turning on and off a LED 370 in a certain timing or in constant frequency (125.6);
operating a solenoid or electro-magnet 365 (125.6;
receiving and sending data to/from the toy's MCU memory 395 (125.7).

Using all these main functions, the toy's software application 125 can control all the toy's features and also receive data from the toy.

The main functions of the slave software application 140 consist of:
receiving and sending data from/to the communication components (410, 420, 430) of the MED (140.1, 140.2);
running the dynamic virtual part of the game (140.3), comprising GUI, data and more. For example, if two toys are approaching each other, then a combat between them may be carried out virtually (in software) or if a toy shoots on e.g. a building toy 270, the virtual instance of this in the software application (130, 140) would be graphical animation of firing on buildings. Moreover, the software applications (130, 140) have a graphical user-friendly interface to the players as opposed to a standard toy's remote control.
using the auxiliary devices (440, 450, 460, 470) for the specific game requirements (140.4);
identify toy (140.5);
track toy (140.6);
calculate navigation commands (140.7).

The main functions of the master software application 130 consist of:
Initiating a game's hardware and software, e.g. initiating variables, resources, number of toys, structures, etc.) (130.1);
searching toys in the arena by sending a general message and waiting for return messages from the toys (130.2);
allocating identities to each toy and sending identity and start messages to slave applications (130.3);
selecting game type: Pre-programmed, Turns, Simultaneous (130.4);
starting/ending/loading/saving or pausing a game (130.5-130.8);
all slave functions for controlling the toys of the player who uses the master MED.

These components and their connections enable a physical game of fleets of toys that is controlled and combined with a virtual game running on the MEDs of the players to occur in any space (like a children's room).

Figure 7:
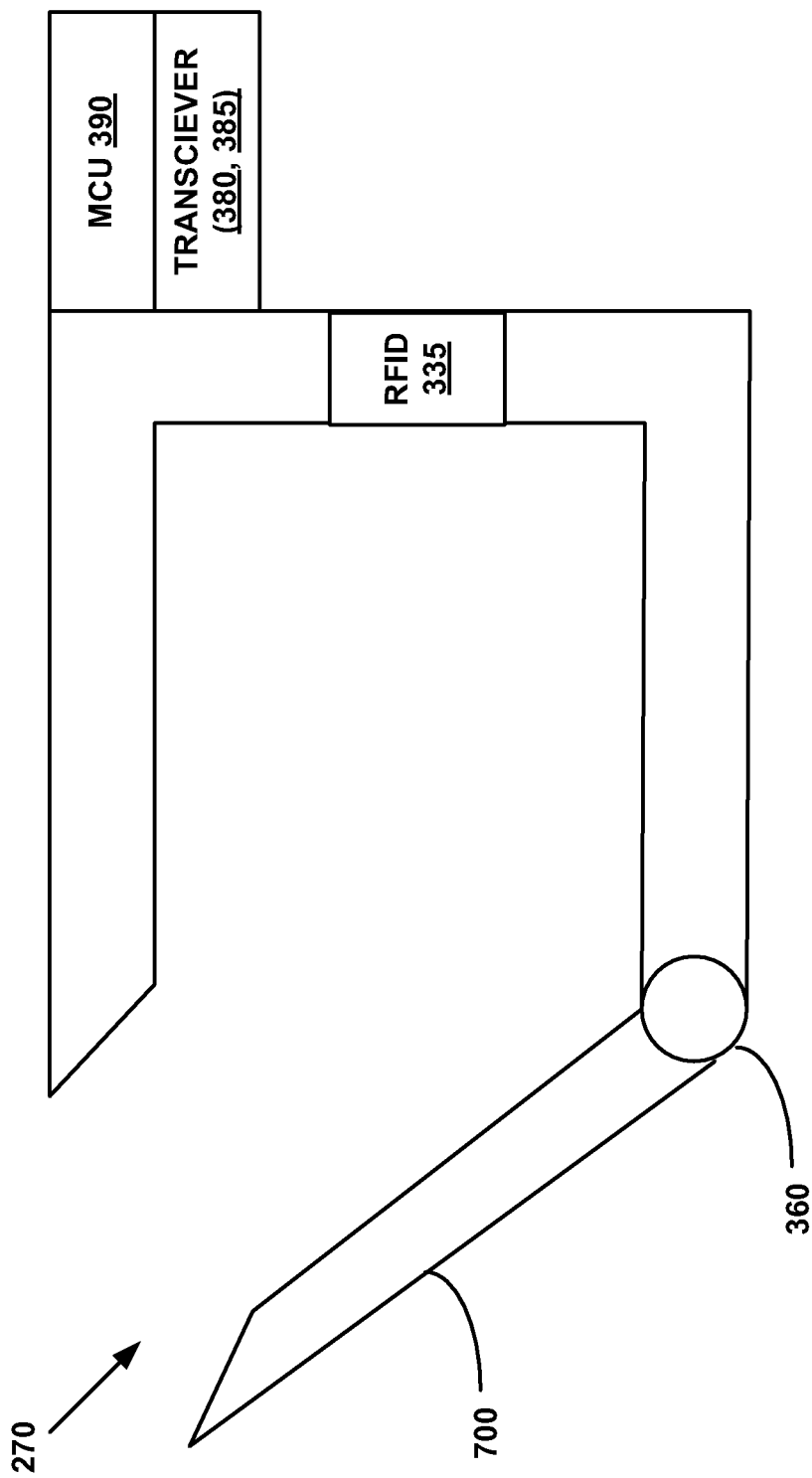
FIG. 7 demonstrate the gate toy (270)

FIG. 7 demonstrates a simple exemplary static toy that is designed 345 as a structure 270 with one servo 360 that opens or closes a door 700. Moreover, the structure includes a MCU 390, a transceiver (380, 385) and a RFID chip 335 that enables it to detect a close by toy (having a RFID chip as well).

FIG. 8 demonstrates a simple, exemplary static toy that is designed 345 as a cannon 250. The cannon toy consists of a MCU 390, a transceiver (380, 385) and a servo 360 that rotates an arm 800 with a light sensor 305. If another toy with a blinking led 370 appears in front of the cannon, the light sensor 305 estimates the blinking frequency and can determine which toy it is shooting at.

Apart from controlling the movements of the toys, the game consists of some elements that may challenge the players.

A first example of a challenging element is a method of stealing a flag from the opponent. The flag 260 is a static toy with a RFID chip 335 and a static magnet 330. The goal of each player 100 may be stealing the flags 260 of his opponents and transferring them into his dynamic structure 270. The dynamic structure 270 (may be a static toy, like a gate for example) consists of a RFID chip 335 detecting that the flag 260 is nearby. Toy 270 sends a message to the appropriate MED 110 that its player 100 has succeeded to steal the opponent's flag. This action may affect the virtual game, like for example granting the player points or money.

The short range communication 380 is between two toys that are close enough (10-30 cm range). If two toys are farther apart than that range their messages won't reach each other. This feature adds a challenging element in the game. Some examples for messages that one toy sends to another close by toy may be: "I shoot at you" or "I heal you" or "I steal resources from you" or "Who are you?" or "I transfer resources to you". All these possibilities and more are very common in virtual games but new in toy games.

We now describe a method of making the toys control more tactical and sophisticated, whereby the game becomes similar to tactical virtual games.

The MCU 390 and memory 395 enable defining a program of commands for the toys. Using 140.2, 125.2 and 125.3, the players 100 can define a sequence of commands for their toys (such as writing a machine code), and this sequence of commands can be stored in the toy's memory 395 and wait for a command to start applying these commands sequentially. For example, the following sequence of commands for a car toy 220 can define an infinite movement in circles:

1. Move forward for 0.5 sec
2. Turn right 30 degrees
3. Repeat steps 1-2 for 12 iterations
4. Wait 1 sec
5. Go to step 1 (loop)

For programming a certain track for the toy to move, the player may place a ribbon on the floor and the toy may "learn" the track using its line sensor 300.

Another example of a more sophisticated sequence of commands for any shooting toy that rotates until it finds an enemy toy and shoots at it:

1. Turn right 10 degrees
2. Ask (using 380): "who is near me?"
3. Wait for a response
4. If the response is from an enemy unit then send message: "I shoot at you"
5. Go to step 1 (loop)

The idea of one toy identifying which toy is in its vicinity can be used not only for shooting but also as seeing or detecting. In the game "hide and seek" a group of toys are the seekers while the other group of toys is hiding. The seeker toys need to "see" the hiding toys.

In a war game, a static or mobile toy may serve as a radar that alerts when a unit is getting near. If a toy has a distance sensor 325 it can estimate distance to another toy in the game. This information along with information of the camera 470 of the MED 110 may provide the software (130,140) information about the coordinates of each toy and hence enable sophisticated commands to the toys like automatically chasing a toy, surrounding a toy/structure, etc.

The automatic chasing is implemented with the information of where the chased toy is, relative to the chaser toy. An improvement for the chaser may be using digital compasses 340 for both the chaser and the chased toys. The readouts from the digital compass are the absolute direction of the toy (relative to the north). These absolute directions of the chaser and the chased toys are sent to the software (130, 140). The software subtracts these angles and returns to the chaser the angle it needs to rotate in order to track the chased toy.

This ability to program toys ahead and store several programs in each toy's memory, enables the players to play in one or more of the following three types of game:

1. Pre-programmed—This type of game is divided into two stages: In the first stage each player writes programs (sequences of commands) for his toys. In this stage there is no physical game; the toys are turned off. The second stage is the activation of the player's programs. In this stage the players are completely passive and only look at the outcome of their programs. All toys of all players are playing simultaneously as they were commanded, e.g. by Logo™ programming:

2. Turns—This type of game is divided into turns for each player (e.g. Dune1™). In one turn, one player or a subgroup of players write programs and run their programs. Meanwhile the other players are on hold (cannot play). When a turn ends for one player (or a subgroup of players) the other players get the control and the first are on hold. Each turn ends when a certain number of commands were given or when the time allocation for one turn has ended.

3. Simultaneous—All the players can control their toys in real-time or by writing a program and running it at the same time. The game runs simultaneously for all players and all toys. For example: Warcraft™, Dune2™, etc.

The virtual part of the game 140.3 may consist of music, graphics, GUI, score, money and resources management and some other functions like: offer treaty, surrender, chat, buy/sell toys from another player.

FIG. 10 demonstrates the first feature of the innovative user interface: selecting toy units from image. The player 100 sees the instances 1000 of the real toys 120 on his MED's touch screen 460 (as long as the toys are in the field of view of the MED's camera 470 and clicking on each of the toy's instances 1000 on the MED's touch screen 460 implies selecting the toy. The method to implement this feature is based on a computer vision algorithm that recognizes the part of the image around the user click and understands which one of the toys was selected (which toy ID). Once the algorithm determined the toy's ID it can communicate with it using the long range communication transmitter (410-430) and send any command to it. Full elaboration of this algorithm will be detailed below.

Figure 11:
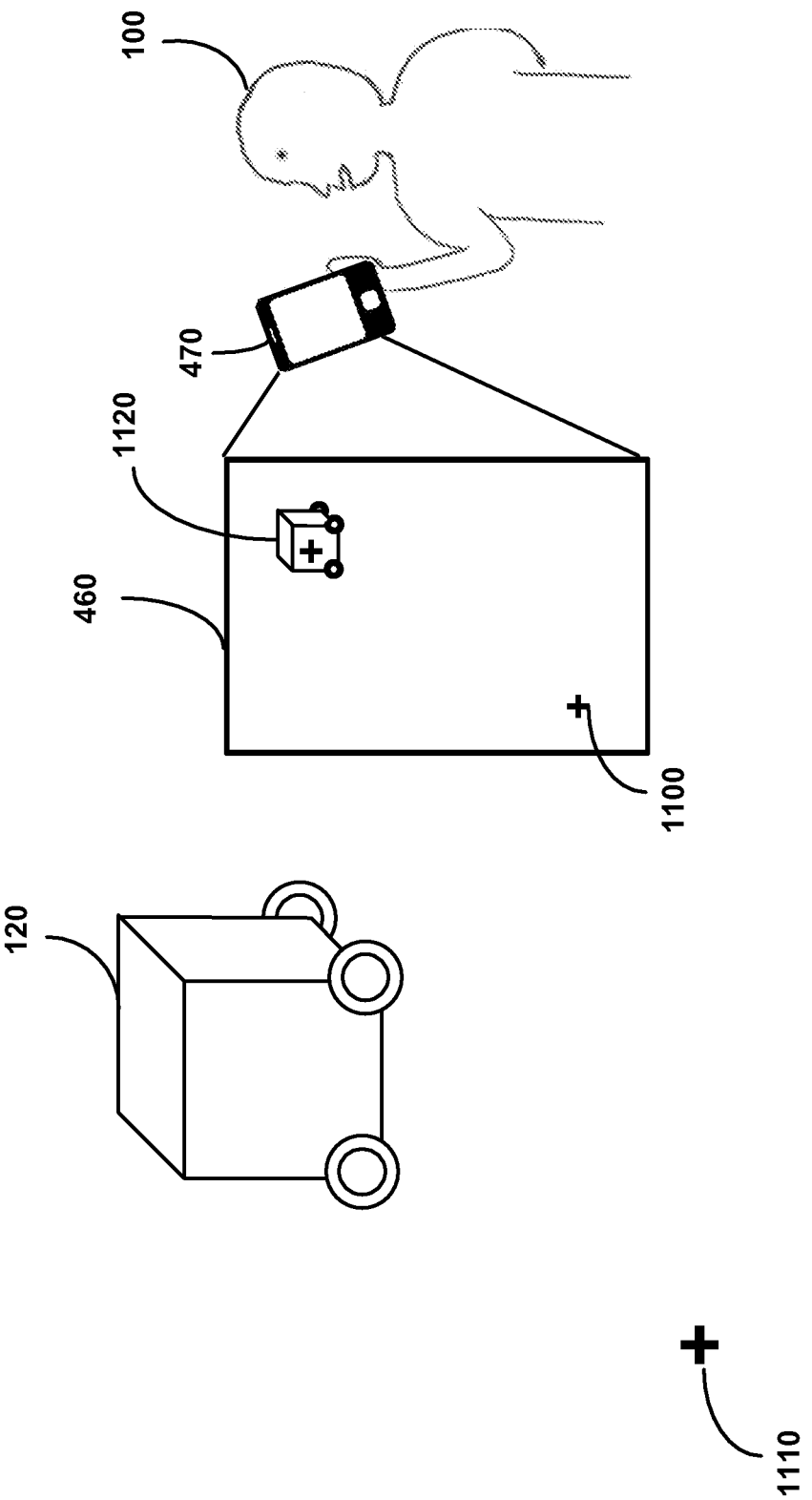
FIG. 11 depict the selecting feature of the user interface.

FIG. 11 demonstrates the second feature of the innovative user interface: navigating toy units from image. After the player 100 has selected a toy by clicking its instance 1000 on the MED's touch screen 460, he clicks any point on the touch screen 1100 that represent a point in the real world (the room) 1110. Then the toy 120 (only for mobile toys) starts maneuvering to the point 1110 in the room. This feature is based on a navigation algorithm that will be detailed below.

User Interface Algorithms

The algorithms described below are implemented by the MED software (130, 140).

The description refers to a single toy and the extension to a fleet of toys is trivial (by applying the same algorithms several times).

Each toy contains a unique physical attribute that enables the algorithm to identify the unit ID from its image (e.g. QR code, marker point, blinking LEDs).

Before the game starts, an initialization process has to be performed with the user\player's cooperation. In this initialization process the algorithm learns the connection between each attribute to each toy ID by asking the player to capture each one of his toys with the MED's camera and provide its ID. Having the unit ID enables sending it data using 410-430.

First Feature: Selecting Toy Unit from Image

Figure 12:
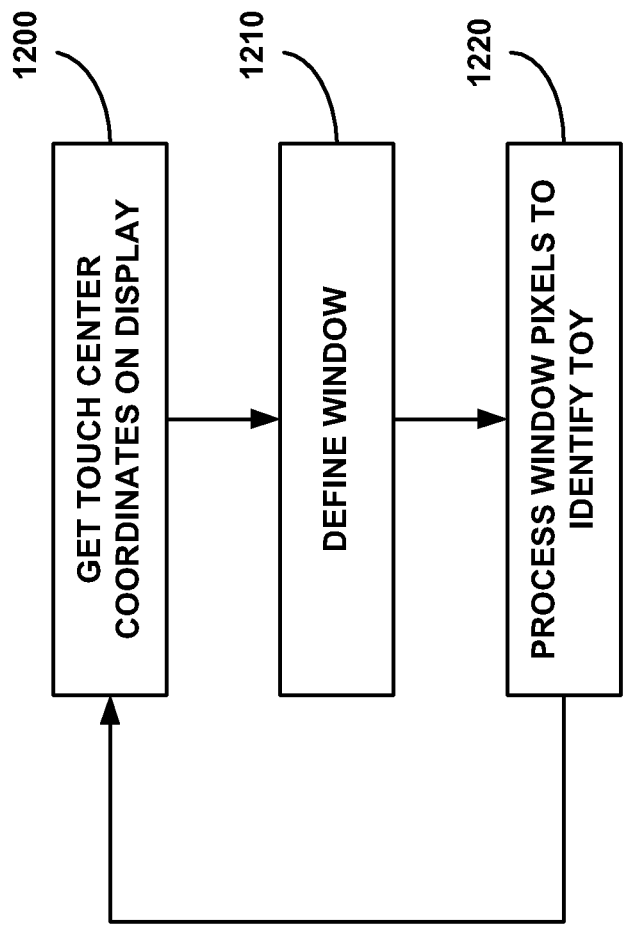
FIG. 12 is a flowchart showing the steps taken by the process of unit selection from the displayed image.

FIG. 12 is a flowchart showing the steps taken by the process of unit selection from the displayed image.

In step 1200, the process received the display coordinates of the touch area center.

In step 1210 the process defines a window of predefined size and shape around the center.

In step 1220 the pixel inside the window's boundaries are processed in order to identify the selected toy.

Additional toys may now be selected.

Identifying a toy (step 1220) may be done using a number of techniques.

For example:

1) Unit identifying based on classic image recognition algorithms like QR code (e.g. http://www.codeproject.com/Articles/20574/Open-Source-QRCode-Library), or feature\descriptors extracting and classification, (e.g. http://vis-www.cs.umass.edu/papers/local_global_workshop.pdf, or http://www.vision.caltech.edu/Image_Datasets/Caltech101/grauman_da rrell_iccv05.pdf, or http://www.imagefeatures.org/), all above resources incorporated herein by reference in their entirety.

2) Unit identifying based on number of blinking LEDs per time unit.

Figure 13:
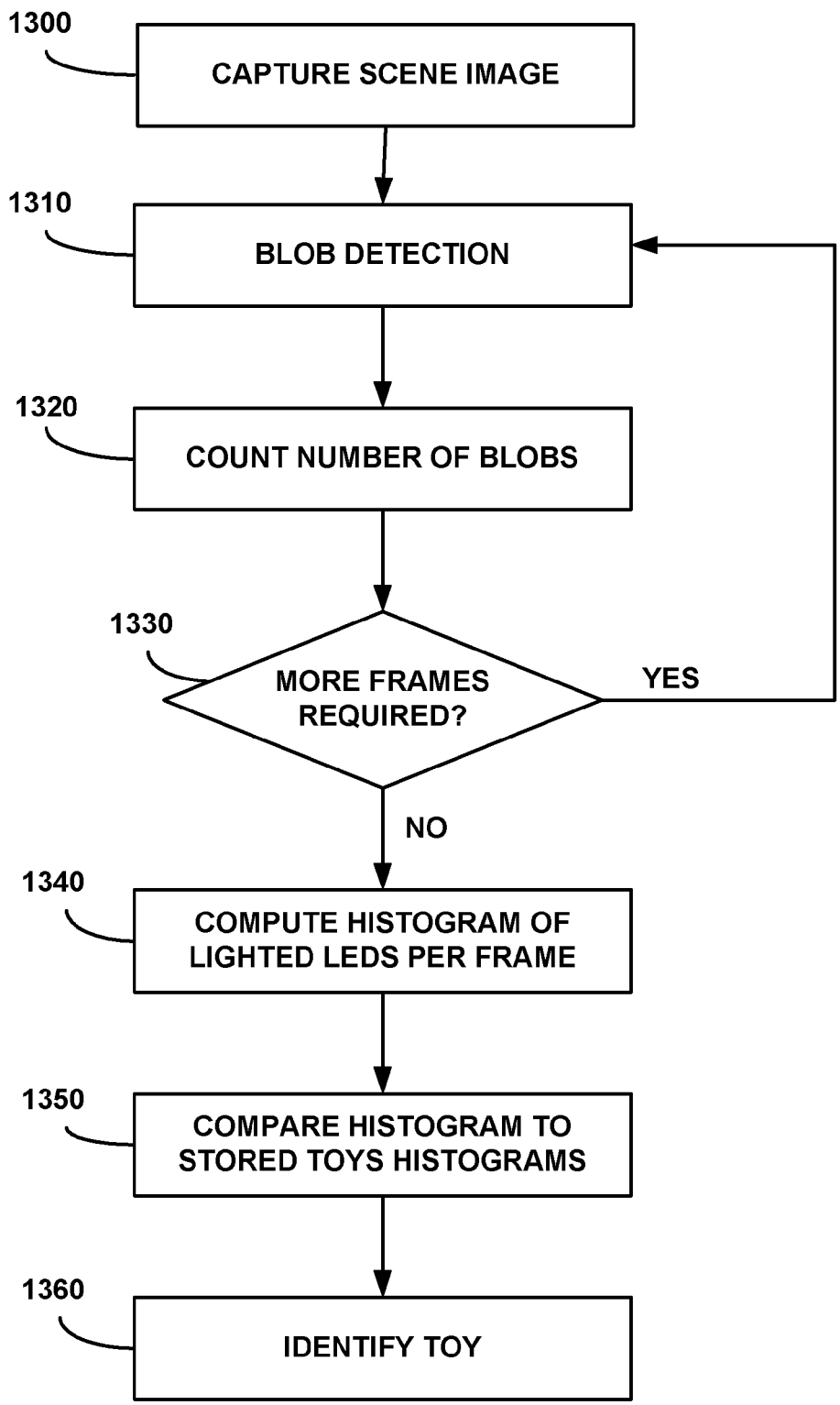
FIG. 13 is a flowchart showing the steps taken by the process of toys identifying based on number of blinking LEDs per time unit.

The process is detailed in the flowchart of FIG. 13.

In step 1300 an image of the scene is captured; In step 1310 the process detects blobs inside the window's boundaries of the captured image detected in step 1210. Possible implementations: grouping on image over threshold, Gaussian based, Laplacian based, Hessian based. (e.g. http://www.v3ga.net/processing/BlobDetection/index-page-download.html or http://www.cs.illinois.edu/~slazebni/spring11/lec08_blob.pdf or http://www.openprocessing.org/sketch/10834), all above resources incorporated herein by reference in their entirety. In step 1320 the process counts the number of detected blobs in the processed window.

Steps 1300 through 1320 are repeated as long as additional frames are required 1330, as determined in the initialization process according to the types and number of toys.

In step 1340 the process computes a histogram of the number of blobs (lightened LEDs) for each frame and in step 1350 the computed histogram is compared to similar toy histograms stored in the system database created during the initialization stage, using any classical metric (minimal square error, cross-correlation, difference in Fourier domain, etc). The best match determines the toy's ID (step 1360).

FIG. 14 shows two exemplary toy histograms showing number of lit LEDs for each frame, i.e. timing sequence of LEDs blinking.

3) Unit identifying based on a lightened pattern.

Figure 15:
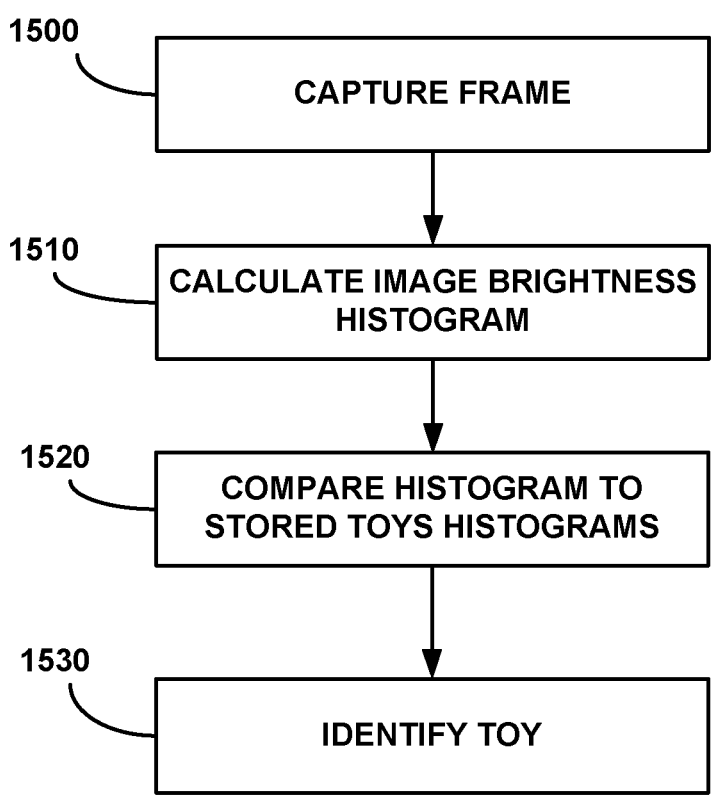
FIG. 15 is a flowchart showing the steps taken by the process of unit identifying based on a lightened pattern.

Using any pattern with various colors\gray levels (the higher the histogram variance the better separation we get) painted on a transparent material that is lightened from below by a LED. This way the acquired pattern is less affected by various luminance conditions in the scene and mainly seen with its inner luminance. The colored pattern is attached to the toy. The process is detailed in the flowchart of FIG. 15.

In step 1500 an image of the scene is captured;

In step 1510 the process computes a brightness histogram of the captured image and in step 1520 the computed histogram is compared to similar toy histograms stored in the system database created during the initialization stage, using any classical metric (minimal square error, cross-correlation, difference in Fourier domain, etc). The best match determines the toy's ID (step 1530).

Figure 16:
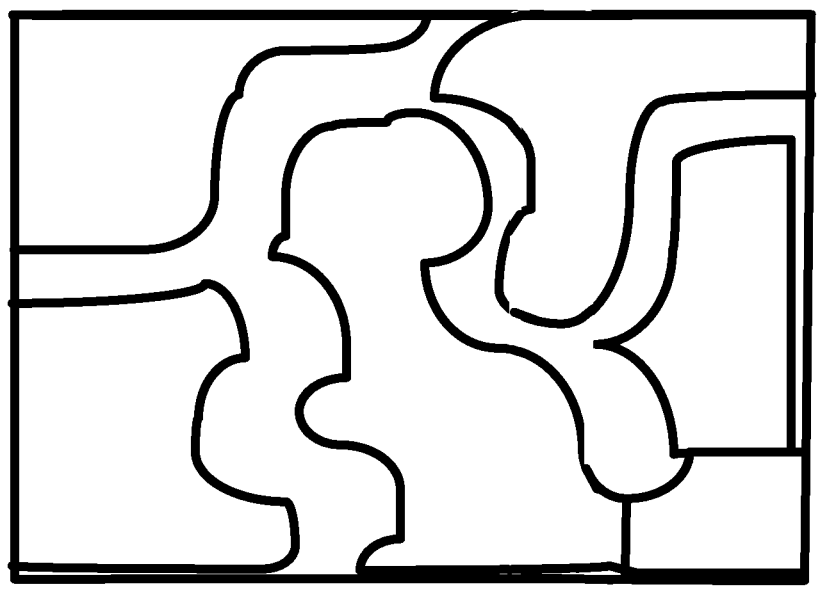
FIG. 16 shows an exemplary pattern with various color levels.

FIG. 16 shows an exemplary pattern with various color levels (distinct areas shown).

Second Feature: Navigate Unit from Image

Once some units were selected, the user can choose to navigate the units by clicking any destination point in the image that represents a destination point in the real world.

If the camera 470 is external and always watches the entire game's arena, the algorithm does not depend on how the player holds his MED.

The navigation algorithm calculates commands to the toy's motors in order to reach the destination point.

Before describing the navigation algorithm we discuss two accessory algorithms: 1) compensating for the MED's tilting and 2) tracking algorithm that estimates the toy's coordinates as long as it is in the field of view.

Accessory Algorithms Description:

1) Image Correction Base on MED's Tilting

Inputs:

IFOV=Optics constants of the camera 470 stands for the opening angle of a single pixel.

R=Orientation matrix of the MED (DCM—Direct Cosine Matrix) between previous to current frame estimated by gyro and accelerometer of MED 450.

(x, y)=Any point to transform

Outputs:

(x_new, y_new)=The point after MED's tilting compensation

Calculate:

$$R^{-1} \cdot \begin{bmatrix} x \cdot IFOV \\ y \cdot IFOV \\ \sqrt{1-(x \cdot IFOV)^2 - (y \cdot IFOV)^2} \end{bmatrix} = \begin{bmatrix} x_1 \\ y_1 \\ z_1 \end{bmatrix}$$

$$(x_{new}, y_{new}) = \left( \frac{x_1}{IFOV}, \frac{y_1}{IFOV} \right)$$

2) Unit Tracking

Given the new frame and the previous location of the target, apply any classic tracking algorithm (blob tracking, kernel-based tracking, contour tracking, feature matching). In case that the pattern is made of blinking LEDs the tracking is easier because the target has the brightest point in the window of search.

Navigation Control Algorithm Description:

The algorithm is a closed loop controller of the motors based on the captured image. At the beginning (or if the toy has stopped for any reasons) a forward-backward movement is commanded in order to firstly estimate the current direction.

Figure 17:
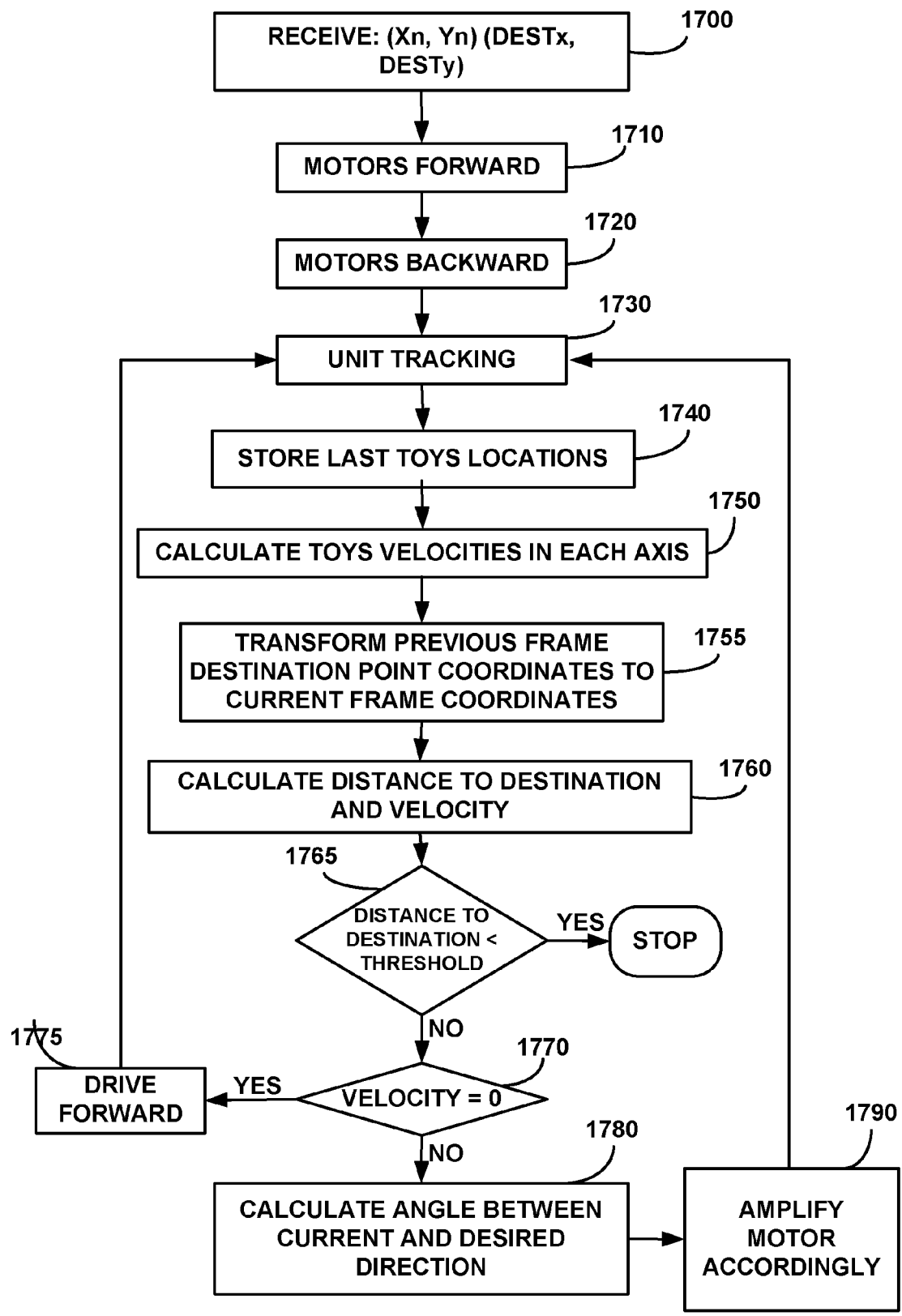
FIG. 17 is a flowchart describing the navigation control process.

FIG. 17 is a flowchart describing the navigation control process.

Inputs:

$(x_n, y_n)$—Location of toy (image pixels coordinates) in frame n $(dest_x, dest_y)$—Initial location of the destination point (image pixels coordinates).

1. In the first frames command the motors to move forward and then backward (steps 1710, 1720), to estimate an initial direction;
2. Apply Unit tracking algorithm described above 1730 and store last n toys' locations: $(x_1, y_1), \ldots, (x_n, y_n)$ 1740;
3. Calculate the toy velocities in each axis $(v^x, v^y)$ by averaging the last n location differences 1750;
4. Transform previous frame destination point coordinates $(dest_x, dest_y)$ into coordinates correspond to current frame using Image Correction Base on MED's Tilting algorithm described above 1755.
5. Calculate 1760:

Distance Vector from last location to destination:

$$\vec{v}_1 = (dest_x - x_n, dest_y - y_n)$$

$$\text{distance\_to\_dest} = \text{norm}(\vec{v}_1)$$

Notate velocity vector by:

$$\vec{v}_2 = (v^x, v^y)$$

$$\text{Velocity} = \text{norm}(\vec{v}_2)$$

6. If distance_to_dest<threshold 1765 then stop ! (destination reached)

If velocity=0 1770 then Drive forward 1775 and return to 2.

Else calculate 1780 the angle between the current advancing direction and the desired advancing direction (towards the destination)

$$\alpha = \text{ang}(\vec{v}_1) - \text{ang}(\vec{v}_2)$$

7. Amplify the motors 1790 according to the rules:

If distance_to_dest is high\low=>motors high\low velocity correspondingly;

If α is high\low (include negative values)=>more to the right\left correspondingly.

Go back to 2.

Figure 18:
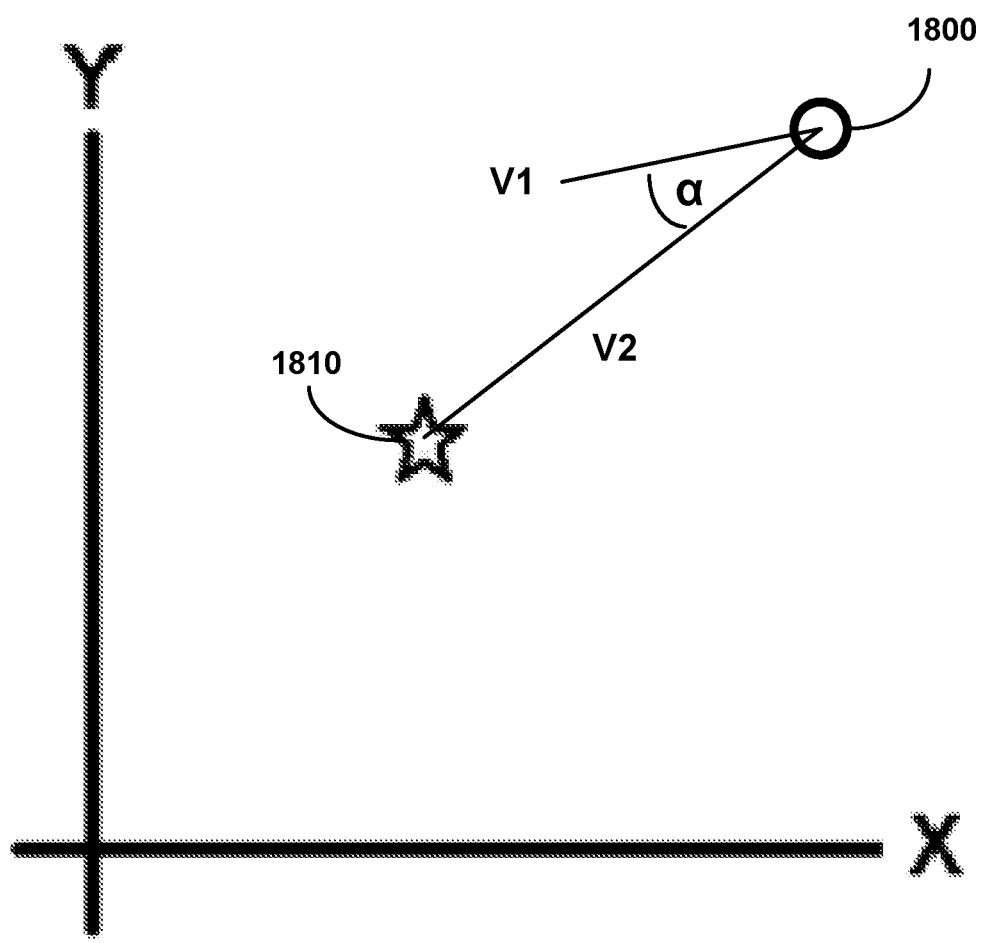
FIG. 18 shows an exemplary virtual game representation.

The calculated direction vectors may be displayed as part of the virtual game representation, as exemplified in FIG. 18, showing a toy's current position 1800, the destination 1810, the direction vectors V1 and V2 and the angle α.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

The invention claimed is:

1. A method of moving a toy in a game comprising physical and virtual components, comprising the steps of:
    capturing an image of a game arena comprising at least one toy and a background;
    displaying said captured image;
    selecting a toy from said display;
    said selecting comprises touching said displayed toy, calculating the center of the touched area on said display and defining a window of predefined size and shape around said calculated center;
    identifying said toy and its current coordinates in the game arena;
    selecting a destination point on said display;
    calculating said destination point coordinates in the game arena; and
    automatically moving said selected toy towards said calculated destination point coordinates.

2. The method of claim 1, wherein identifying said toy comprises identifying according to a specific pattern.

3. The method of claim 2, wherein identifying according to a specific pattern comprises using one of: image recognition algorithm, histogram of number of blinking LEDs per time unit and brightness histogram.

4. The method of claim 1, wherein automatically moving said selected toy comprises tracking said toy, calculating said toy's current motion parameters and automatically controlling the motion parameters towards said selected destination.

5. The method of claim 4, wherein said toy's motion parameters comprise velocity and direction.

* * * * *